United States Patent
Yang et al.

(10) Patent No.: US 7,636,768 B2
(45) Date of Patent: Dec. 22, 2009

(54) METHODS AND SYSTEMS FOR ADAPTIVE DELIVERY OF MULTIMEDIA CONTENTS

(75) Inventors: Yudong Yang, Beijing (CN); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1088 days.

(21) Appl. No.: 11/025,255

(22) Filed: Dec. 29, 2004

(65) Prior Publication Data
US 2005/0154743 A1 Jul. 14, 2005

Related U.S. Application Data

(62) Division of application No. 09/995,499, filed on Nov. 26, 2001, now Pat. No. 7,093,001.

(51) Int. Cl.
G06F 15/16 (2006.01)
G06F 17/00 (2006.01)

(52) U.S. Cl. ..................... 709/219; 707/100
(58) Field of Classification Search ............. 709/219; 707/100
See application file for complete search history.

(56) References Cited

U.S. PATENT DOCUMENTS

| | | | |
|---|---|---|---|
| 5,537,526 A | 7/1996 | Anderson et al. | |
| 5,704,029 A | 12/1997 | Wright | |
| 6,023,714 A | 2/2000 | Hill et al. | |
| 6,167,409 A | 12/2000 | DeRose et al. | |
| 6,230,174 B1 | 5/2001 | Berger et al. | |
| 6,300,947 B1 | 10/2001 | Kanevsky | |
| 6,345,279 B1 * | 2/2002 | Li et al. | 707/104.1 |
| 6,546,406 B1 | 4/2003 | DeRose et al. | |
| 6,556,217 B1 | 4/2003 | Makipaa et al. | |
| 6,564,263 B1 | 5/2003 | Bergman et al. | |
| 6,573,907 B1 | 6/2003 | Madrane | |
| 6,680,976 B1 * | 1/2004 | Chen et al. | 375/240.26 |
| 6,785,676 B2 | 8/2004 | Oblinger | |
| 6,876,628 B2 | 4/2005 | Howard et al. | |
| 2001/0054049 A1 | 12/2001 | Maeda et al. | |
| 2002/0099829 A1 | 7/2002 | Richards et al. | |
| 2002/0156807 A1 | 10/2002 | Dieberger | |
| 2003/0005159 A1 | 1/2003 | Kumhyr | |
| 2003/0037076 A1 | 2/2003 | Bravery | |
| 2003/0095135 A1 | 5/2003 | Kaasila et al. | |
| 2003/0101203 A1 | 5/2003 | Chen et al. | |

(Continued)

OTHER PUBLICATIONS

Cai et al, "Extracting Content Structure for Web Pages based on Visual Representation", ACM Transactions on Info. Sys., vol. 20, No. 1, Jan. 2002.

(Continued)

Primary Examiner—Patrice Winder
Assistant Examiner—Taylor Elfervig
(74) Attorney, Agent, or Firm—Lee & Hayes, PLLC

(57) ABSTRACT

Methods and systems for generic adaptive multimedia content delivery are described. In one embodiment, a novel framework features an abstract content model and an abstract adaptive delivery decision engine. The abstract content model recognizes important aspects of contents while hiding their physical details from other parts of the framework. The decision engine then makes content adaptation plans based on the abstracted model of the contents and needs little knowledge of any physical details of the actual contents. Thus, under the same framework, adaptive delivery of generic contents is possible.

20 Claims, 14 Drawing Sheets

U.S. PATENT DOCUMENTS

| | | | |
|---|---|---|---|
| 2004/0085341 A1 | 5/2004 | Hua et al. |
| 2004/0086046 A1 | 5/2004 | Ma et al. |
| 2004/0088726 A1 | 5/2004 | Ma et al. |
| 2004/0172484 A1 | 9/2004 | Hafsteinsson et al. |
| 2004/0187080 A1 | 9/2004 | Brooke et al. |
| 2005/0108637 A1 | 5/2005 | Sahota et al. |
| 2007/0156677 A1 | 7/2007 | Szabo |

OTHER PUBLICATIONS

"Schema Objects", Chapter 10, Oracle 8i Concepts, Release 8.15, 1999.

Refreshable Braille Displays, Mar. 11, 2000, retrieved from the Internet Oct. 26, 2005: http://web.archive.org/web/200000311151437/http://www.deafblind.com/display.html>, pp. 1-2.

Visually Impaired, Aug. 22, 2002, retrieved from the Internet Oct. 26, 2005: <http://web.archive.org/web/20020822193408/http://linusdocs.org/HOWTOs/Access-HOWTO-3.html>, pp. 1-6.

Ma et al., A Framework for Adaptive Content Delivery in Heterogeneous Network Enviornments, Jan. 2000, SPIE vol. 3969, Proceedings of MMCN00, San Jose, USA.

Zhang, Adaptive Content Delivery: A New Application Area for Media Computing Research. Jan. 2000, Available at http://research.microsoft.com/china/papers/Adaptive_Content_Delivery.pdf.

M.A. Smith & T. Kanade, "Video Skimming and Characterization through the Combination of Image and Language Understanding Techniques," Proc. of Computer Vision and Pattern Recognition, 1997 IEEE, pp. 775-781.

L. Itti & C. Koch, "Computational Modelling of Visual Attention," Nature Reviews/Neuroscience, vol. 2, Mar. 2001, pp. 1-11.

L. Itti, C. Koch & E. Niebur, "A Model of Saliency-based Visual Attention for Rapid Scene Analysis," IEEE Trans. on Pattern Analysis and Machine Intelligence, 1998, 5 pages.

L. Itti & C. Koch, "A Comparison of Feature Combination Strategies for Saliency-Based Visual Attention Systems," Proc. of SPIE Human Vision and Electronic Imaging IV (HVEI'99), San Jose, CA, vol. 3644, 10 pages, Jan. 1999.

Yu-Fei MA & Hong-Jiang Zhang, "A New Perceived Motion Based Shot Content Representation," Microsoft Research China, 4 pages.

Yu-Fei MA & Hong-Jiang Zhang ,"A Model of Motion Attention for Video Skimming," Microsoft Research Asia, 4 pages.

Colin O'Toole et al., "Evaluation of Automatic Shot Boundary Detection on a Large Video Test Suite," School of Computer Applications & School of Electronic Engineering, Dublin City University, Glasnevin, Dublin, Ireland, Challenge of Image Retrieval, Newcastle, 1999, pp. 1-12.

T. Lin, H.J. Zhang, Q.Y. Shi, "Video Scene Extraction by Force Competition," IEEE Intl. Conference on Multimedia and Expo (ICME 001), Waseda University, Tokyo, Japan, Aug. 22-25, 2001, 4 pages.

Lee, Keansub et al., "Perception-Based Image Transcoding for Universal Multimedia Access," School of Electrical Engineering Korea University, Seoul, Korea, 2001 IEEE, pp. 475-478.

Christopoulos, Charilaos et al., "The JPEG2000 Still Image Coding System: An Overview," IEEE Transactions on Consumer Electronics, vol. 46, No. 4, pp. 1103-1127, Nov. 2000.

Chen, Jinlin et al., "Function-based Object Model Towards Website Adaptation," (2001) Proc. of the 10th Int. WWW Conf. 10 pages.

Manola, "Towards a Web Object Model", Object Services and Consulting, Inc., at<<http://www.objs.com ./OSA/wom.htm>>, Feb. 10, 1998, 60 pgs.

"Abstraction", retrieved on date Jan. 30, 2007, at <<http://www.webopedia.com/TERM/a/abstraction.html>>, Jupitermedia Corporation, 2007, pp. 1-2.

Breslauer, et al., "A Lower Bound for Parallel String Matching", Annual ACM Symposium on Theory of Computing, 1991, pp. 439-443.

Karkkainen, et al., "Two and Higher Dimensional Pattern Matching in Optimal Expected Time", SODA '94: Proceedings of the fifth annual ACM-SIAM symposium on Discrete algorithms, 1994, pp. 715-723.

Navarro, "A Guided Tour to Approximate String Matching", ACM Computing Surveys, vol. 33, No. 1, Mar. 2001, pp. 31-88.

Smith, et al., "Scalable Multimedia Delivery for Pervasive Computing", ACM, Multimedia 99, 1999, pp. 131-140.

\* cited by examiner

The 3Mbps VBR Bitstream through 1Mbps Channel

The 3Mbps VBR Bitstream through 2Mbps Channel

The 1.2Mbps CBR Bitstream through 512kbps Channel

The 1.2Mbps CBR Bitstream through 768kbps Channel

First 100 GOPs of the 3Mbps VBR Bitstream (1731 frames)

First 100 GOPs of the 1.2Mbps CBR Bitstream (1577 frames)

METHODS AND SYSTEMS FOR ADAPTIVE DELIVERY OF MULTIMEDIA CONTENTS

RELATED APPLICATION

This application is a divisional of and claims priority to U.S. patent application Ser. No. 09/995,499, filed on Nov. 26, 2001, the disclosure of which is incorporated by reference herein.

TECHNICAL FIELD

This invention relates to methods and systems for adaptive delivery of multimedia contents.

BACKGROUND

Today we live in a diversified world with a seemingly infinite number of diverse and different sources of on-line information. Typically, this information is accessed via a network such as the Internet. As the Internet and, more generally, computing evolve, people are beginning to become accustomed to and demanding better access to different types of electronically available information.

Against the backdrop of the diverse and different sources of electronic information is the wide range of devices that are connected being used to access the information. For example, people can now typically access network-accessible information using personal computers, handheld computers, personal digital assistants and the like. The situations encountered by individuals attempting to access this diverse collection of information using an ever growing collection of computing devices differs from user session to user session.

For example, some contents may be authored and suitable for use with a certain type of browser. Yet, the contents may not be suitably acceptable for use in other situations. For example, web contents that are authored for use in connection with a browser installed on a personal computer may not be suitable for display on a small handheld device for reasons not the least of which include the size disparity between the different devices' displays.

One possible solution for this problem is to author the same contents so that they reside in different forms that are suitable for all of the different situations that might be encountered. While this is theoretically possible, the solution is practically infeasible due to the time and expense involved.

One area of promise is in the area of so-called adaptive content delivery. One goal of adaptive content delivery is to have content that is readily or easily adaptable to different computing environments.

Early commercial applications focused on providing faster web page downloads for narrow bandwidth connected users (such as dialup and mobile access). Most of the applications accelerated downloads by simply reducing the sizes of embedded image files using aggressive lossy compression schemes. The cost of this solution is lower quality, which is highly undesirable from a customer service standpoint. Some schemes also supported lossless text compression to reduce the transmission time of web pages.

Some companies such as ProxyNet (based on TranSend technology), SpyGlass, and OnlineAnywhere provide proxies or servers that can adjust web pages to fit the display of smaller devices. Their technologies, however, are based on heuristic rules and customized content filters that are designed for specific websites and are used to extract the most important contents from these web pages. Thus, these solutions tend to be rigid and inflexible.

Accordingly, this invention arose out of concerns associated with providing adaptive systems and methods for efficient and flexible content delivery.

SUMMARY

Methods and systems for generic adaptive multimedia content delivery are described. In one embodiment, a novel framework features an abstract content model and an abstract adaptive delivery decision engine. The abstract content model recognizes important aspects of contents while hiding their physical details from other parts of the framework. The decision engine then makes content adaptation plans based on the abstracted model of the contents and needs little knowledge of any physical details of the actual contents. Thus, under the same framework, adaptive delivery of generic contents is possible.

DETAILED DESCRIPTION

Overview

Adaptive content delivery systems and methods are described. Efficiency and flexibility are promoted through a novel solution to generic adaptive multimedia content delivery. Described embodiments are based on an abstract content model that captures important or critical structures and attributes of contents. Contents are modeled as hierarchical directional graphs. Nodes on graphs represent elements of contents. The concept of an "edge" is introduced. Edges define logical relationships between these elements. By finding optimized sub-graphs on these graphs under some constraints, optimized plans for adaptive content delivery can be made. With the help of the abstract content model, optimization procedures for many different types of contents can be standardized. Accordingly different types of contents can be treated equally under this framework.

Exemplary Computer Environment

Figure 1:
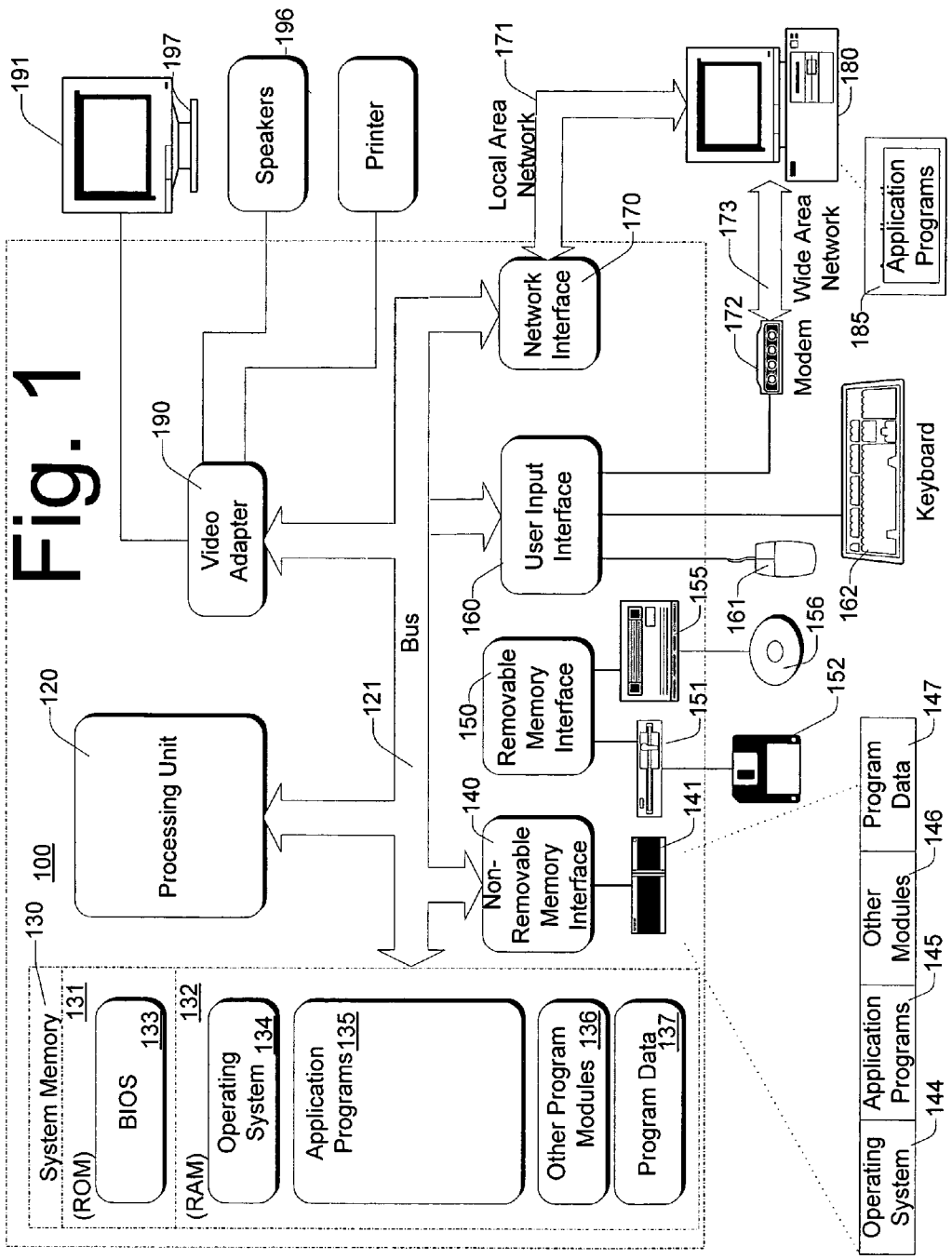
FIG. 1 is an exemplary computer system that can be utilized in accordance with one or more embodiments.

The various components and functionality described herein can be implemented by various computers. FIG. 1 shows components of a typical example of such a computer, referred to by reference numeral 100. The components shown in FIG. 1 are only examples, and are not intended to suggest any limitation as to the scope of the claimed subject matter; the claimed subject matter is not necessarily dependent on the features shown in FIG. 1.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network: In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 1, the components of computer 100 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 100 typically includes a variety of computer-readable media. Computer-readable media can be any available media that can be accessed by computer 100 and includes both volatile and nonvolatile media, removable and non-removable media. By way of example, and not limitation, computer-readable media may comprise computer storage media and communication media. "Computer storage media" includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 100, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 100 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface such as interface 150.

The drives and their associated computer storage media discussed above and illustrated in FIG. 1 provide storage of computer-readable instructions, data structures, program modules, and other data for computer 100. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 100 through input devices such as a keyboard 162 and pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer may operate in a networked environment using logical connections to one or more remote computers, such as a remote computer 180. The remote computer 180 may be a personal computer, a server, a router, a network PC, a peer device or other common network node, and typically includes many or all of the elements described above relative to computer 100. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 100 is connected to the LAN 171 through a network interface or adapter 170. When used in a WAN networking environment, the computer 100 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 100, or portions thereof, may be stored in the remote memory storage device. By way of example, and not limitation, FIG. 1 illustrates remote application programs 185 as residing on computer 180. It will be appreciated that the network connections shown are exemplary and other means of establishing a communications link between the computers may be used.

Exemplary Embodiment

In the embodiment about to be described, the inventive adaptive content delivery system works as an extended content processor of traditional multimedia content servers. Accordingly, upon receipt of a content request, the server fetches original multimedia contents from a content source and passes them to the adaptive delivery system. Adaptation results are then sent as a response to the request.

Figure 2:
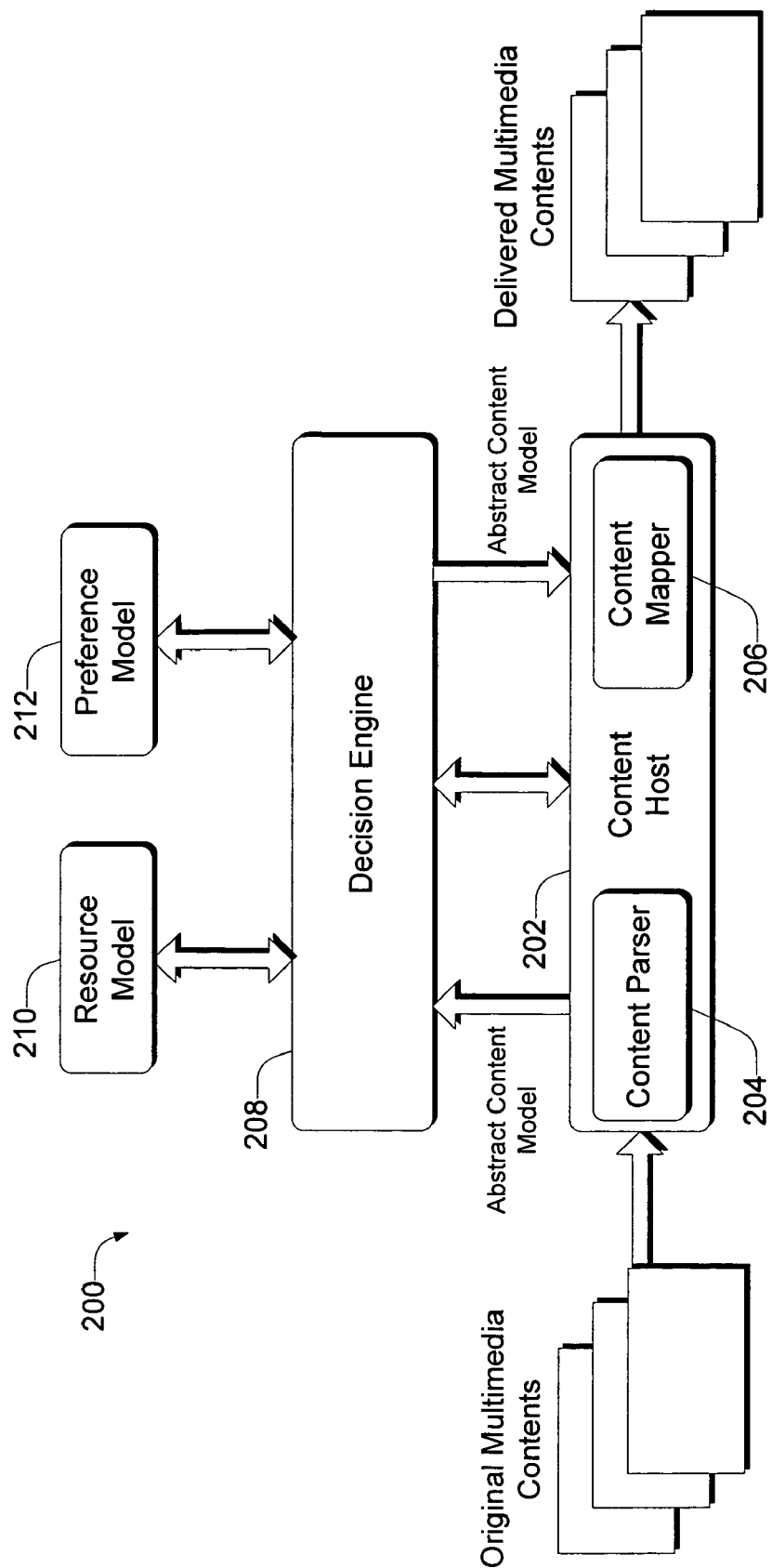
FIG. 2 is a block diagram of an exemplary adaptive content delivery system in accordance with one embodiment.

FIG. 2 shows an adaptation system 200 in accordance with one embodiment. System 200 includes a content host 202 that acts as a front-end between physical multimedia contents and the rest of the system. The content host comprises a content parser 204 and a content mapper 206. Content host 202 processes the original multimedia contents to provide an abstract content model which is provided to a decision engine 208 for processing. In this example, the abstract content model can be the only data of which other system components (e.g. the decision engine) are aware. Physical details of the original multimedia content are thus hidden by the abstract content model. Other input parameters, such as network characteristics and client capabilities, are modeled as resources (i.e. resource model 210) or preference factors (i.e. preference model 212). The decision engine 208 then makes best-fit delivery plans based on these parameters and the abstract content model. Each of these components is explored in more detail below.

Content Host

As the illustrated and described content host 202 is a front-end between physical contents and other system components, it can be used to manipulate contents based on the abstract content model. In addition, the content host 202 also defines a common set of application program interfaces or APIs for retrieving extended properties of the abstract content model. Exemplary APIs are given at the end of this document. Although the remaining components of the system are content independent, content host 202 itself is dependent on content types. Thus, different media types may desire different implementations of the content host. As a common basis, however, the content host 202 should comprise two sub-modules: content parser 204 and content mapper 206.

In the illustrated and described embodiment, content parser 204 scans input contents and constructs corresponding abstract content model representations either online or offline. Different formats of the same content and capabilities of supported transcoders can also be abstracted into the same model during this process. Specific examples of how this can be done are, given below. Characteristics of one suitable technique for implementing the content parser are described in U.S. patent application Ser. No. 09/893,335, entitled "Function-based Object Model for Use in WebSite Adaptation" filed on Jun. 26, 2001, the disclosure of which is incorporated by reference herein.

Content mapper 206 functions in a manner that is opposite of the way content parser 204 functions. That is, content mapper 206 converts abstract content model representations back to physical contents. Real-time-capable content transcoders may also be called at this stage to generate desired results.

Decision Engine

Decision engine 208 provides functionality for making content adaptation plans. In the illustrated example, decision engine 208 selects appropriate contents that achieve maximum total QoS (i.e. quality of service) values according to current resource constraints and preference factors (as provided by resource model 210 and preference model 212). Based on the abstract content model, this problem is solved by finding optimized sub-graphs of the abstract content model that maximize QoS values under resource constraints. Details of an exemplary content optimization procedure are covered in the section entitled "Content Optimization" below.

Resource and Preference Models

Input parameters, such as network characteristics and client capabilities, are modeled as resources or preference factors. Resources are used as constraints while the decision engine is looking for the best delivering plans. Preference factors are used to alter QoS factors of the abstract content models. For dynamically changing parameters, such as network characteristics, these models should be able to predict future values since the decision engine may use forward-looking algorithms. More information is provided on this topic in the section entitled "A Simple Sub-optimization Algorithm" below.

Caching

Although a caching stage is not explicitly included FIG. 2, caches can play an important role in real adaptive content delivery systems. Complex transcoding processes can be avoided if the needed results are in cache. Partial plans of delivery can also be saved in the cache and reused under nearly identical content request situations. These savings will decrease the server-side resource requirements and thus better quality of service (QoS) can be achieved when server-side resources become the bottleneck of the delivery plans.

Figure 2A:
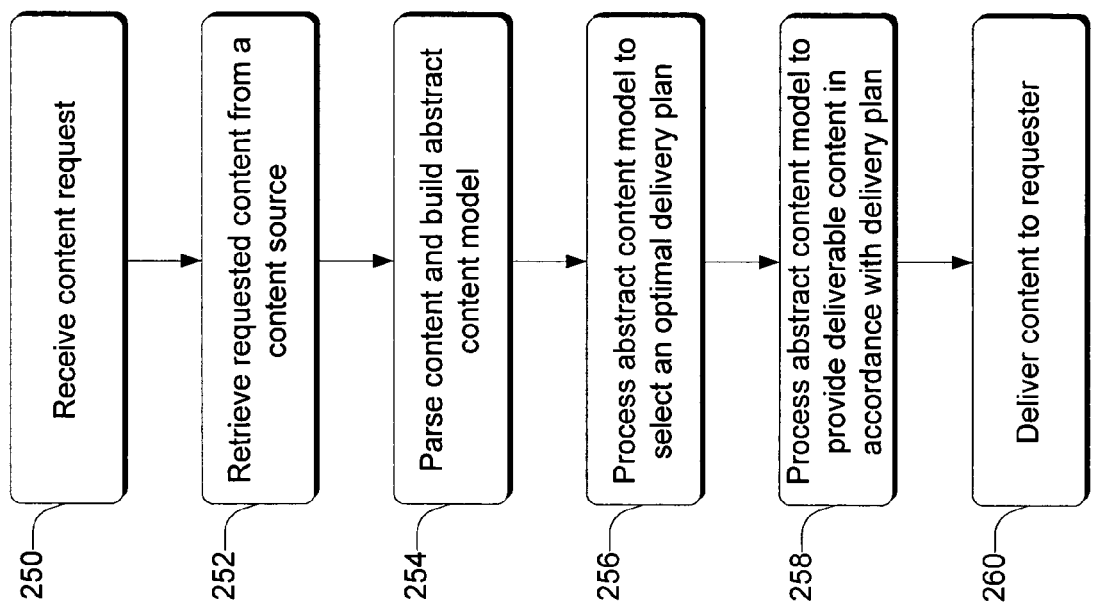
FIG. 2a is a flow diagram that describes steps in a method in accordance with one embodiment.

FIG. 2a is a flow diagram that describes steps in a method in accordance with one embodiment. The steps can be implemented in any suitable hardware, software, firmware or combination thereof. In the present example, the steps are implemented in software. In addition, any suitable software architecture can be utilized to implement the steps about to be described. One exemplary software architecture is shown and described in connection with FIG. 2 above. It should be appreciated, however, that FIG. 2 shows but one exemplary software architecture and should not be construed to limit application of the claimed subject matter except where so specifically recited. In the example about to be described, the processing steps reflect what can be considered as an "on-line" mode. By "on-line" is meant that the processing can take place responsive to a content request. Aspects of the described processing can, however, take place in an "off-line" mode where contents are pre-processed, for example, prior to receiving a specific request for the contents. For example, when content is received by a server for storage, the content can be pre-processed to build the abstract content model. Subsequently, when any requests are received, the server can simply retrieve the abstract content model and select an appropriate delivery plan. Such is explored in more detail in FIG. 2b.

Step 250 receives a content request. This step can be implemented responsive to a client device sending such a request. Step 252 retrieves the requested content from a content source and step 254 parses the content and builds an abstract content model. An exemplary abstract content model is described below in more detail. Step 256 processes the abstract content model to select an optimal delivery plan. Examples of how this can be done are described below. Step 258 then processes the abstract content model to provide deliverable content in accordance with the delivery plan. Step 260 then delivers the content to the content requester.

Figure 2B:
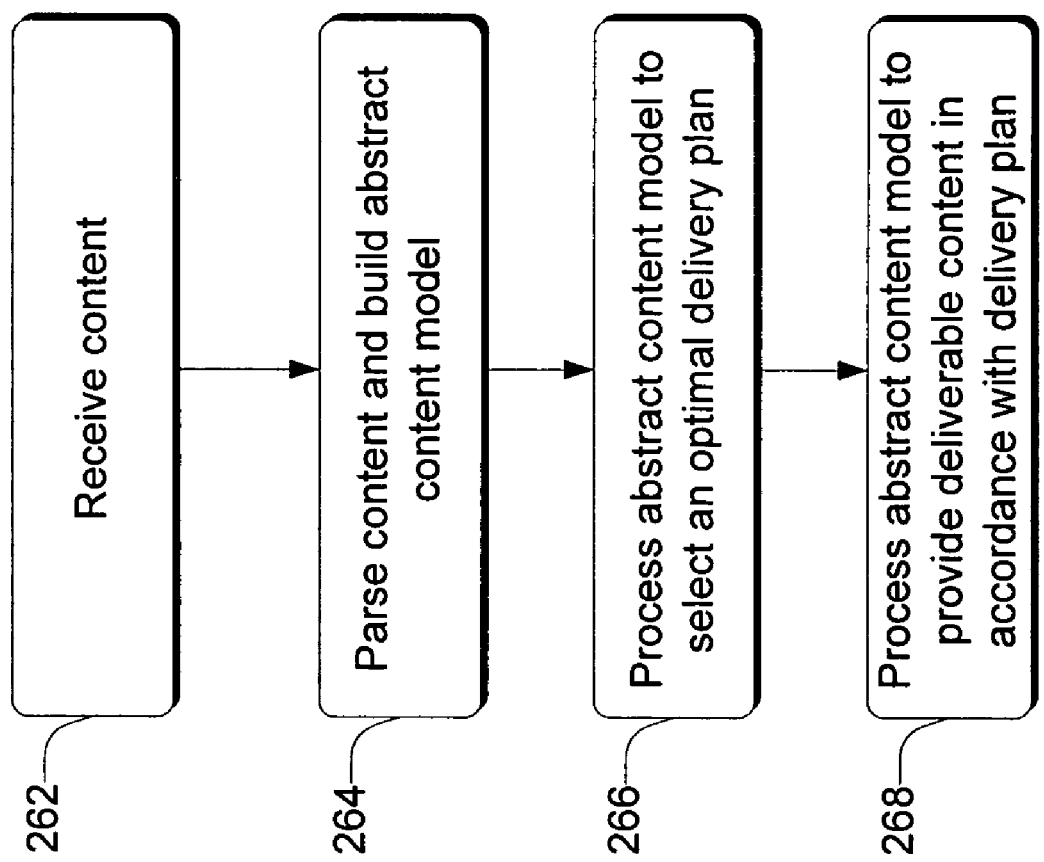
FIG. 2b is a flow diagram that describes steps in a method in accordance with another embodiment.

FIG. 2b is a flow diagram that describes steps in a method in accordance with another embodiment. The steps can be implemented in any suitable hardware, software, firmware or combination thereof. In the present example, the steps are implemented in software. In addition, any suitable software architecture can be utilized to implement the steps about to be described. The processing about to be described can pertain to the "off-line" mode mentioned above.

Step 262 receives content. This step can be implemented in any suitable way. For example, this step can be implemented when a server receives content that it is to store for future content requests. Step 264 parses the content and builds an abstract content model. An exemplary abstract content model is described below in more detail. Step 266 processes the abstract content model to select at least one optimal delivery plan. Examples of how this can be done are described below. Step 268 then processes the abstract content model to provide deliverable content in accordance with the delivery plan.

In accordance with the FIG. 2b embodiment, content can be pre-processed so that when a content request is received, the system can simply retrieve either the abstract content model and process it to provide a delivery plan, or it can retrieve the deliverable content in accordance with the client device sending the request.

Exemplary Abstract Content Representation Structure (ACRES)

One of the important goals of the described adaptive content delivery framework is to make the framework a generic content adaptation solution. The decision engine 208 (FIG. 2) is designed to make optimal content delivery plans without having to consider too many physical details of the contents (such as that of encoding formats, special attributes, and the like). As a result, an abstract model of the contents is utilized. This model is desirably able to represent different kinds of contents and their structures (i.e. semantic, dependency, encoding, and the like) for efficient delivery. Described below is an exemplary multi-layered data structure that can represent a huge range of delivery-ready multimedia contents.

Definitions

In the illustrated and described embodiment, the abstract content model comprises a directional graph that features a top-down hierarchical structure. The hierarchical structure comprises multiple nodes that represent components of the contents, and edges between the nodes represent relationships between these components. In the discussion that follows, definitions of these data models and their basic attributes are given. Then, a discussion of the details of nodes and edges is presented.

Figure 3:
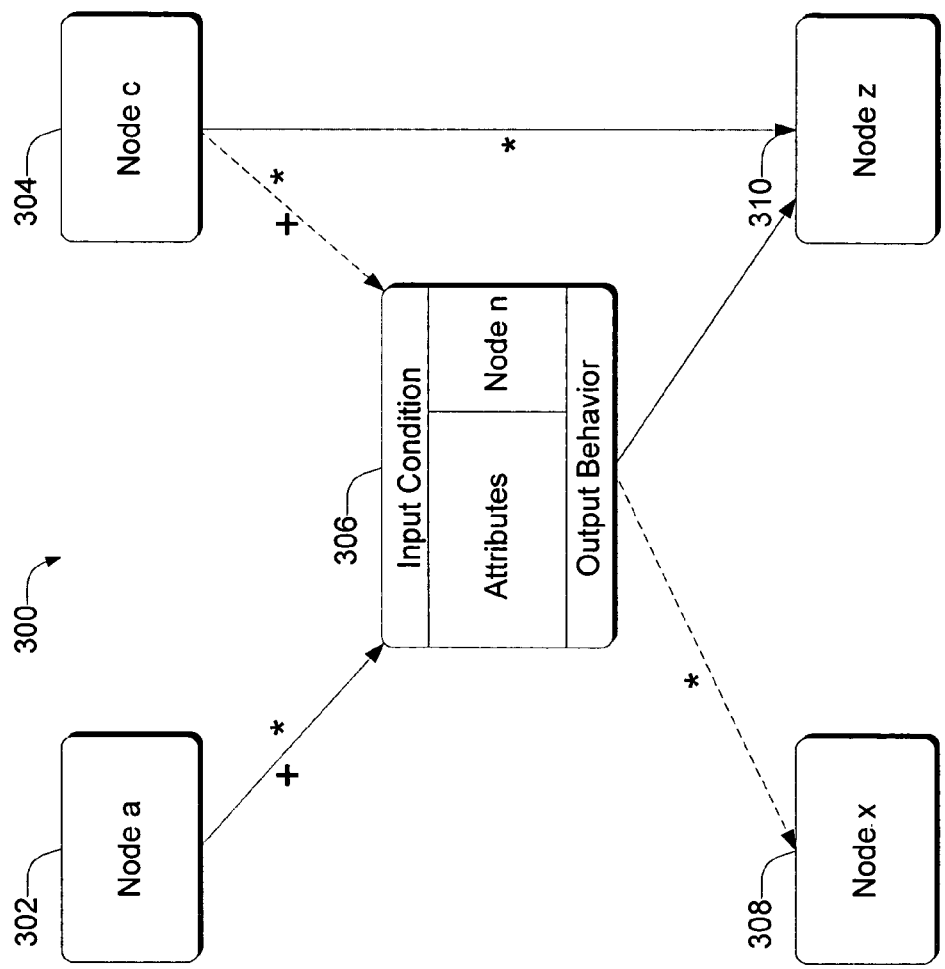
FIG. 3 is a block diagram that illustrates an exemplary abstract content representation structure in accordance with one embodiment.

For the discussion that follows, the reader is referred to FIG. 3 which provides an illustration of an exemplary abstract content representation structure 300 in accordance with one embodiment.

In the illustrated structure 300, a node is an abstract representation of content or content structure. A Node is represented using a circle or square in the drawings of the data structure. In FIG. 3, five exemplary nodes are indicated at 302, 304, 306, 308, and 310. An edge is an abstract representation of relationships between the nodes. In this embodiment, edges can be divided into three different types. A dependency edge defines a logical dependency between nodes. In FIG. 3, a thin dashed line is used to represent dependency edges. Dependency edges are seen to extend between nodes 304, 310 and 302, 306. A route edge defines an ordered or hierarchical dependency between nodes. Thick solid lines are used to represent this kind of edge. In FIG. 3, a route edge extends between nodes 306, 310. A mixed edge is a mixture of a dependency edge and a route edge and can be considered as two edges separately. Thick dashed lines are used in FIG. 3 to represent this type of edge. A mixed edge can be seen to extend between nodes 304, 306 and 306, 308.

Abstract content representation structure 300 comprises a directional graph G=(N, E) that satisfies the following condition (layered constraint), where N and E stand for "node" and "edge" sets of G:

The node set N can be divided into several subsets as $N_i$, $i=1 \ldots m$ where $$N = \bigcup_{i=1}^{m} N_i$$

and $N_i \cap N_j = \Phi$, $\forall i,j=1 \ldots m, i \neq j$.

$\forall a=(n_s, n_e) \in E$, there exists a pair of $1 \leq i < j \leq m$ such that $n_s \in N_i$ and $n_e \in N_j$.

$\forall a=(n_s, n_e) \in E, s \neq e$.

From this definition one can also see that nodes in $N_1$ do not have incoming edges and nodes in $N_m$ do not have out going edges. In addition to these definitions, nodes and edges have several basic attributes as listed below.

Node and Edge Attributes

Node status defines the dynamic statuses of nodes during content delivery. In the illustrated and described embodiment, the node statuses include the following:

Inactive: The node is not yet a deliverable object because of an unsatisfied active condition (defined below).

Activable: The active condition of the node is satisfied but the node is not yet included in a delivery plan.

Activated: The node has been chosen in a delivery plan.

Delivered: The node has been delivered successfully to a content receiver.

Skipped: The node is not delivered and will not be included in the current plan due to some reason.

Figure 4:
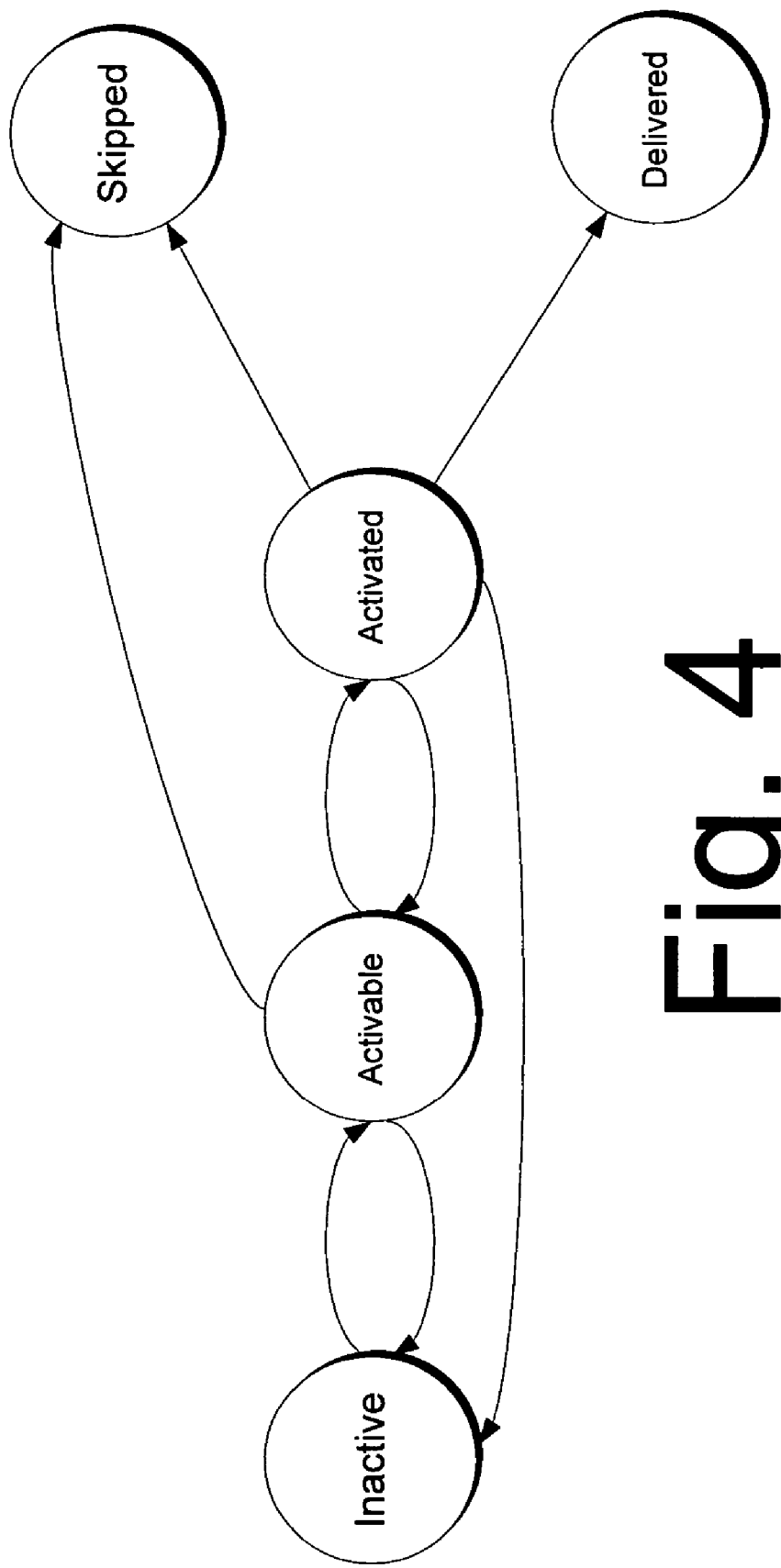
FIG. 4 is a diagram that illustrates transfers of node statuses.

FIG. 4 illustrates some possible transfers between these statuses. Specifically, an inactive node can become activable and vice versa. In addition, an activated node can become inactive. Activable nodes can become activated or skipped, and so on.

An ignition edge is defined as a dependency edge from a node that is activated, delivered or skipped. In FIG. 3, which statuses are to be considered are specified deliberately and marked as '+', '*' and '-' respectively, or no markers are drawn if all three statuses are fine, i.e. if no action is to be taken. For example, in FIG. 3, the edge between nodes 302 and 306 is an ignition edge if node 302 is activated or delivered.

An active condition defines how the node becomes activable. In the illustrated example, there are three conditions:

Automatic: The node is automatically activable. One example is the top most nodes (such as those in set $N_1$). These nodes are considered as the potential starting point of delivery. In the drawings in this document, automatically activable nodes are designated mark with a "#".

OR condition: The node is activable if at least one of its input edges is an ignition edge. There is no marker for these kinds of nodes in the drawings.

AND condition: The node is activable only if all its input edges are ignition edges. These nodes are designated with a "&" in the drawings.

An input condition defines when an activable node can be activated. In the present embodiment, except for automatic activable nodes, the only condition is that there exists an incoming route edge from an activated, delivered or skipped node. An output behavior defines how nodes on ends of outgoing route edges can be branched. In the illustrated and described embodiment, a "branch" comprises the operation of changing an activable node to an activated node. In this example, there are three branch operations:

Complementary branch: All activable nodes can be branched. In the drawings in this document, there are no markers for these nodes.

Exclusive branch: Only one from all activable nodes can be branched. In the drawings in this document, these nodes are designated with a "%".

Tight branch: All activable nodes must be branched. A '$' is used to designate these nodes.

Nodes and Edges

As indicated above, nodes and edges are the basic elements of the described abstract content representation structure. Nodes and edges represent content objects and relationships between these objects. In addition to the basic attributes introduced and discussed above, nodes and edges can have other extended attributes.

Nodes

As an abstraction of multimedia contents, a node can represent a piece of raw content like a picture, a paragraph of text, a video frame, or a chunk of bits in some coded contents. It can also work as a connection point of content structures where it does not represent any actual contents. In addition to its basic attributes, nodes can have some additional application related attributes.

A value (QoS factor) is defined as an increment to content quality when this node has been delivered. For a node $n \in N$, its value is represented by $V(n)$ or $V(n, t)$ if it is related to time.

A resource factor defines an amount of resources needed to deliver the node. For some types of resources r, one can represent corresponding resource factors of node n by $R(n, r)$.

Edges

Edges can represent any kind of relationship between node objects. Some possible edge meanings are listed below:

Semantic inclusion: A node at the end of an edge is included in some semantic scope of the node at the beginning of the edge. E.g.: news stories (each as a node) of a specific category (a structural node), chapters of a book, etc.

Dependency: Delivery of a node at the end of an edge depends on delivery of the node at the beginning of the edge. E.g.: succeeding video frames (especially inter-coded ones), different resolution layers of images/video clips, etc.

Expansion: A node at the end of an edge is an expansion to contents described by the node at the beginning of the edge. E.g.: high-resolution images to icons, video sequences to key-frames, full texts to abstracts, etc.

Transcoder capability: Transcoder capabilities can also be represented by an abstract content representation structure. A structural node of an "exclusive branch" is inserted as a placeholder of original content. Original content and possible transcoding results are inserted under that node. Transcoding complexities can be modeled as some kinds of resource requirement factors of each node. E.g.: different format and resolution of an image, multilingual versions of some articles, etc.

Some Examples of Using Abstract Content Representation Structures

Figure 5:
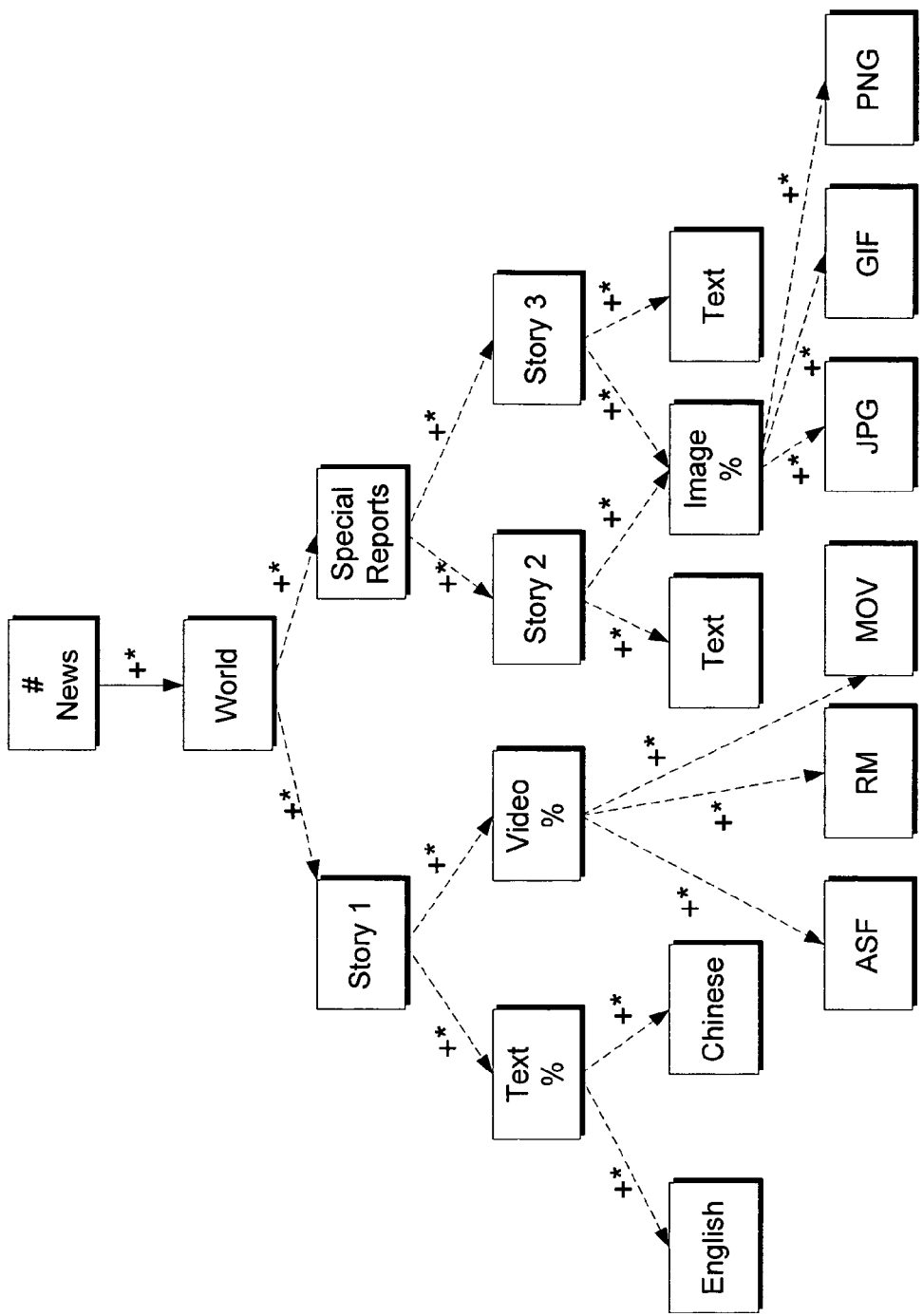
FIG. 5 is a diagram that illustrates an exemplary abstract content representation structure of typical news content combined with possible transcoder capabilities.

FIG. 5 shows an example that uses an abstract content representation structure to represent contents associated with typical news data and some transcoding scenarios. Starting from the topmost nodes, the news stories are classified or categorized as world, domestic, etc. Then in each category, there may be standalone stories and collections of specific topics that contain related stories (such as the node designated "Story 1"). A story can include different contents and these contents can be transcoded into different types, such as multiple encoding formats, multilingual translations, etc. These different possibilities are also represented by the data model and are selected and delivered dynamically according to client capabilities and user preferences.

In the section entitled "ACRES and Adaptation Methods in Detail" below and the related figure, an example of how to use an abstract content representation structure to represent MPEG I video bitstreams together with frame-skipping transcoders for bitrate adaptation is provided.

Content Optimization

Using the abstract content representation structure, optimized content can be considered as an optimal sub-graph of the corresponding structure. One target of optimization is to maximize preference-altered total QoS factors of abstract content representation structure nodes covered by the subgraph under the constraints of the resources. In the section immediately below, some suggestions on choosing proper QoS factors are presented. Then a discussion of a simple bounded search algorithm as a near optimal solution to this content optimization problem will be presented. The algorithm is also used in a verification prototype that is introduced in the section entitled "Adaptive MPEG I Video Streaming" below.

Choosing Proper QoS Factors

The QoS factors of abstract content representation structure nodes play an important role in content optimization. This is because the decision engine 208 (FIG. 2) is programmed to decide which content is more suitable based on QoS factors. Accordingly, it can be advantageous for properly selected QoS value definitions to at least conform to the following two principles. First, the QoS value definitions should reflect the importance of the corresponding content. Second, the QoS values of different nodes should be comparable.

In many cases, the first principle is easier to follow and conforming to the second principle is usually not trivial. It may not be easy to tell which is more important or meaningful as between two different contents. For example, there is a famous saying that says "a picture is worth a thousand words". This might be true in some cases, but not in others. In resource critical applications such as mobile communication, text should be more preferable than images most of the time. Thus, it is suggested that QoS definition choices be made on an application specific basis.

A Simple Sub-Optimization Algorithm

In the illustrated and described embodiment, a bounded search algorithm is adopted to find the near optimal solution of the content optimization problem. The pseudo code listed below describes but one optimized adaptive content delivery algorithm. The algorithm is a straightforward implementation of a deep-first search.

```
(node, value) BestNode(ACRES, step, max_steps)
{
    if step >= max_steps then return (NULL, 0);
    BestCandi = NULL;
    BestValue = 0;
    Candi_Set = GetActivableNodes(ACRES);
    Resource = GetFreeResource( );
    for each candi in Candi_Set do
    {
        resCandi = GetResource(candi);
        if resCandi > Resource then next;
        MarkActived(candi);
        ConsumeResource(resCandi);
        valCandi = GetQoSValue(candi)
            *GetPreference(candi)
            + BestNode(ACRES, step+1, max_steps).value;
        if valCandi > BestValue then
        {
            BestCandi = candi;
            BestValue = valCandi;
        }
        FreeResource(resCandi);
        MarkActivable(candi);
    }
    return (BestCandi, BestValue);
}
AdaptiveDelivery(ACRES, max_steps)
{
    do
    {
        (node, value) = BestNode(ACRES, 0, max_steps);
```

```
        if node ! = NULL then
        {
            MarkActived(node);
            ConsumeResource(GetResource(node));
            Deliver(node);
        }
        UpdateSystemStatus( );
    }
    while Not Meet_End_Condition( );
}
```

The pseudo code starts from a candidate set of activable nodes and then tries to simulate following delivery plans by marking nodes on the path as activated temporarily. A back trace is then used to find other possible delivery plans. Finally, the best starting candidate is selected and delivered. Afterwards, system statuses, such as resources and preferences, are updated. The algorithm is then looped until the end condition is met. It will be appreciated that in some cases, dynamically changing factors, such as network resources, may have to be predicted during the search.

Because there are only limited search depths, the complexity of this algorithm is quite acceptable. However, the algorithm may become complex in some cases. Pruning of search branches is not currently done because node QoS factors may depend on resource consumption of previously selected nodes and thus may change dynamically. Under such a situation, historical records are not reusable and searching cannot be accelerated by pruning. In order to benefit from pruning, modifications can be made. For example, one way to benefit from pruning is to replace continuous values with approximate discrete ones (as time, QoS, resource).

Adaptive MPEG I Video Streaming Example

As a verification and example of the inventive framework, a simple adaptive MPEG I video streaming application was implemented and based on the content optimization algorithm and above-described abstract content representation structure. One goal of this application is to allow smoothed playback of MPEG I video even when transmission bandwidth is less than that which the original video bitstream requires and/or the client-side buffer size is limited.

In the discussion that follows, we start from an analysis of the situation and then we will build an abstract content representation structure of the MPEG I video bit stream that is used in our adaptive delivery verification prototype. After that, a brief introduction will be given to our implementation's architecture. Experimental results are discussed later.

Abstract Content Representation Structures and Adaptation Methods in Detail

Since an adaptable abstract content representation of content is the basis of the inventive approach, this discussion starts by analyzing adaptation schemes of MPEG I video and then constructs the abstract content representation model that enables the adaptation scheme based on the analysis.

As it was designed, MPEG I video bitstreams do not support scalable delivery. Network bandwidth must be large enough to enable smooth playbacks in normal cases. Transcoders are required if network bandwidth is less than the original video requires. However, online transcoding of MPEG video bitstreams is computing intensive and does not suit video streaming applications where multiple contents/connections need to be supported simultaneously. For this reason, a simpler adaptation approach is chosen by selectively replacing/skipping encoded video frames. This approach is very efficient and the video bitrate is reduced at the cost of lower frame rates instead of PSNR losses resulting from normal transcoding.

There are three kinds of encoded video frames in MPEG I video bitstreams—Intra coded, forward Prediction coded and Bi-directional prediction coded. These frame types provide a trade-off between compression efficiency and playback requirements (as seek and error recovery). Several encoded frames form a GOP (group of picture) and temporal references of frames are defined relatively within GOPs. Beside a sequence header that defines essential attributes, video bitstreams are typically a concatenation of GOPs. I frames can be decoded at anytime, but decoding of P and B frames depends on decoded reference frames. In other words, there are relationships that exist as inter-frame dependencies and temporal orders. As a result, skipping I and P frames will cause P and B frames that follow not to be decodable. Skipping B frames has no impact on other frames.

Beside these inter-frame dependencies, frame timing is another issue that is addressed during content adaptation. Although video bitstreams with some skipped frames can be decoded without any problems, the frame timing is changed. As a remedy, escape-coded frames are used instead of skipping where PB frames should be skipped. Thus frame timing is kept unchanged during playback. The escape-coded frames are MPEG I coded frames too and they stand for nothing changed to the reference frame (or one of the reference frames if the frame type is B). According to MPEG I syntax, all macroblocks of a frame must be covered by non-overlapped slices, and a slice must start and end by coded macroblocks. Thus, the minimal escape coded frame must consist of at least two empty coded macroblocks (top-left and bottom-right) and address skip codes for all other macroblocks between them. As a result, the minimal size of an escape coded CIF frame (P or B) is 32 bytes which is minor, if compared to that of normally coded frames which are at least several kilobytes.

Figure 6:
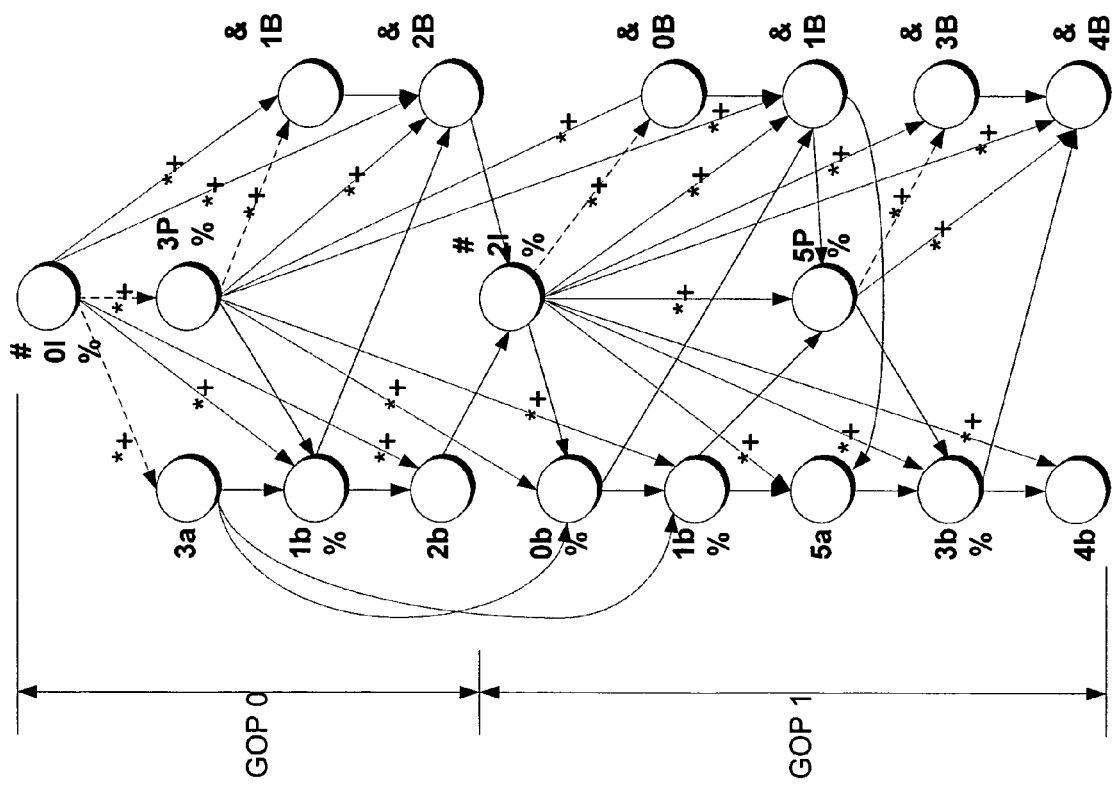
FIG. 6 is a diagram that illustrates an exemplary abstract content representation structure of an MPEG I video sequence "IPBBIBBPBB . . . "

In accordance with the above discussion, FIG. 6 shows an exemplary abstract content representation model of a typical MPEG I video bitstream. Each node in the figure represents data of a coded frame as "I", "P", "B". Additionally, the designations of "a" or "b" represent data of escape-coded frames for P or B frames respectively. The temporal reference of each frame is shown as a number before the frame type. Data of the sequence header and GOP headers are not shown in this figure due to limited space.

Each node in this model has attributes including data size, expected time to be decoded (TTD) relative to the starting time of delivery, and QoS factor. The QoS factor is defined dynamically according to the current time and TTD. In this example, this value is assigned based on the following heuristics:

The value of frame data depends on frame types and effects on decoding of succeeding frames. I>P>B> escape-coded.

The value of a frame should be maximized when it is available for the decoder just on or before its TTD and decrease to zero when it is not delivered after TTD plus some maximum tolerable delay time.

Figure 7:
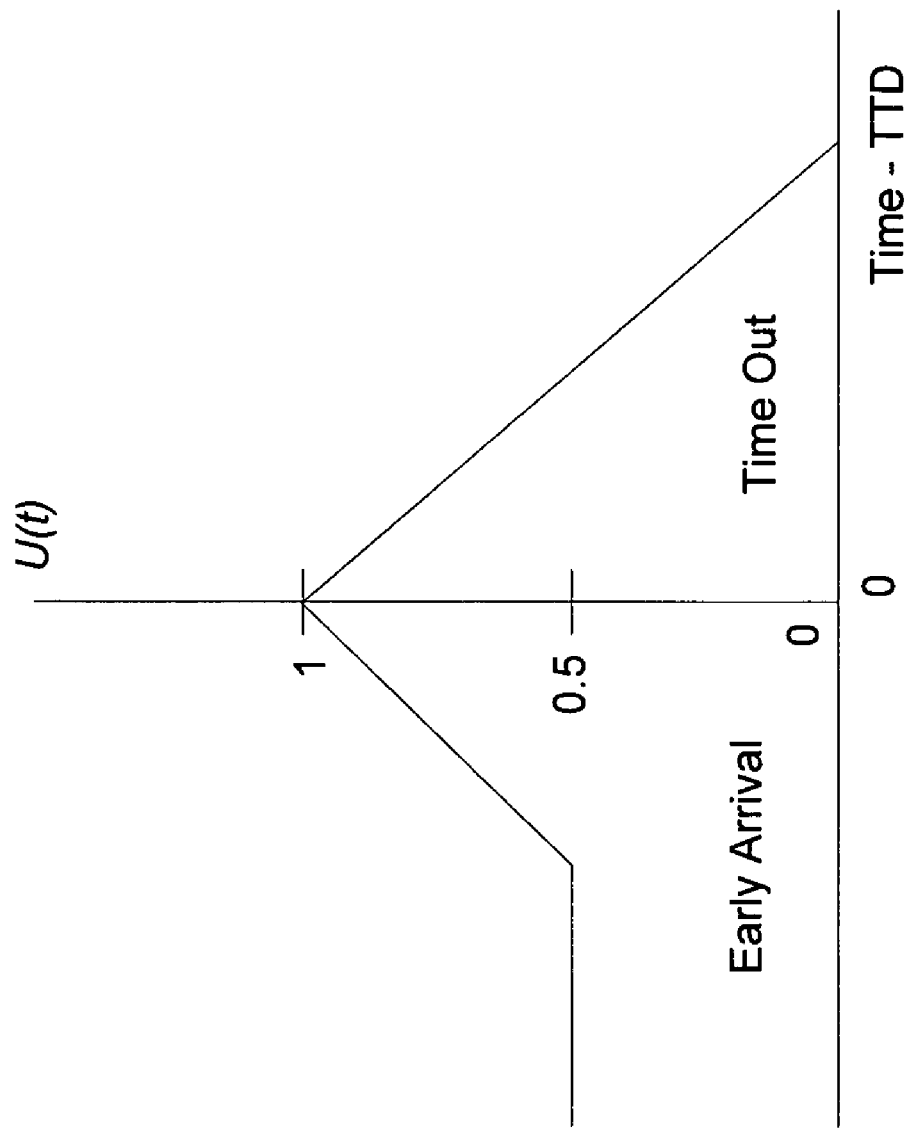
FIG. 7 is a graph of the unified QoS factor of the FIG. 6 MPEG I abstract content representation structure nodes.

FIG. 7 shows the unified QoS factor of all frame types in this experimental system. The function has two parameters: early arrival defines the time the frame data arrives before TTD; timeout defines when the frame data arrives too late to be decoded. These two values are chosen according to application situations. A larger early arrival time may result in larger client-side buffer requirements and a larger timeout may cause delays during playback. On the other hand, smaller values will also affect delivered video quality.

In the described experimental system, some content information is also taken into consideration. From the viewpoint of sampling theory, we can see that frames in fast motion sequences should be preserved with higher precedence than those in slow motion sequences during the frame dropping process. It is also known that those frames containing more motion information will normally use more bits than those frames containing less motion information when they are predictive-coded. As a result, the QoS factor of node n is defined as $V(n, t)=U(t)*coded\_size(n)$. However, its effects are very limited when video bitstreams are CBR coded.

System Implementation

In this described example, the prototype was implemented as a WWW service extension to MS Internet Information Server running on MS Windows NT. The adaptation application runs as an ISAPI extension on IIS. Video data is processed and streamed in real-time from an original source through a standard HTTP protocol stack provided by IIS. A bandwidth-limitation software pipe was used as a simple emulation of network bandwidth. Adapted video data are firstly sent through this pipe before IIS sends it out. Parameters such as emulation bandwidth and optimizer search steps are all sent to the server as request parameters. Several popular client applications that support playback of MPEG I video have been successfully tested using HTTP streaming including Windows Media Player and QuickTime Player.

Experimental Results

Figure 8:
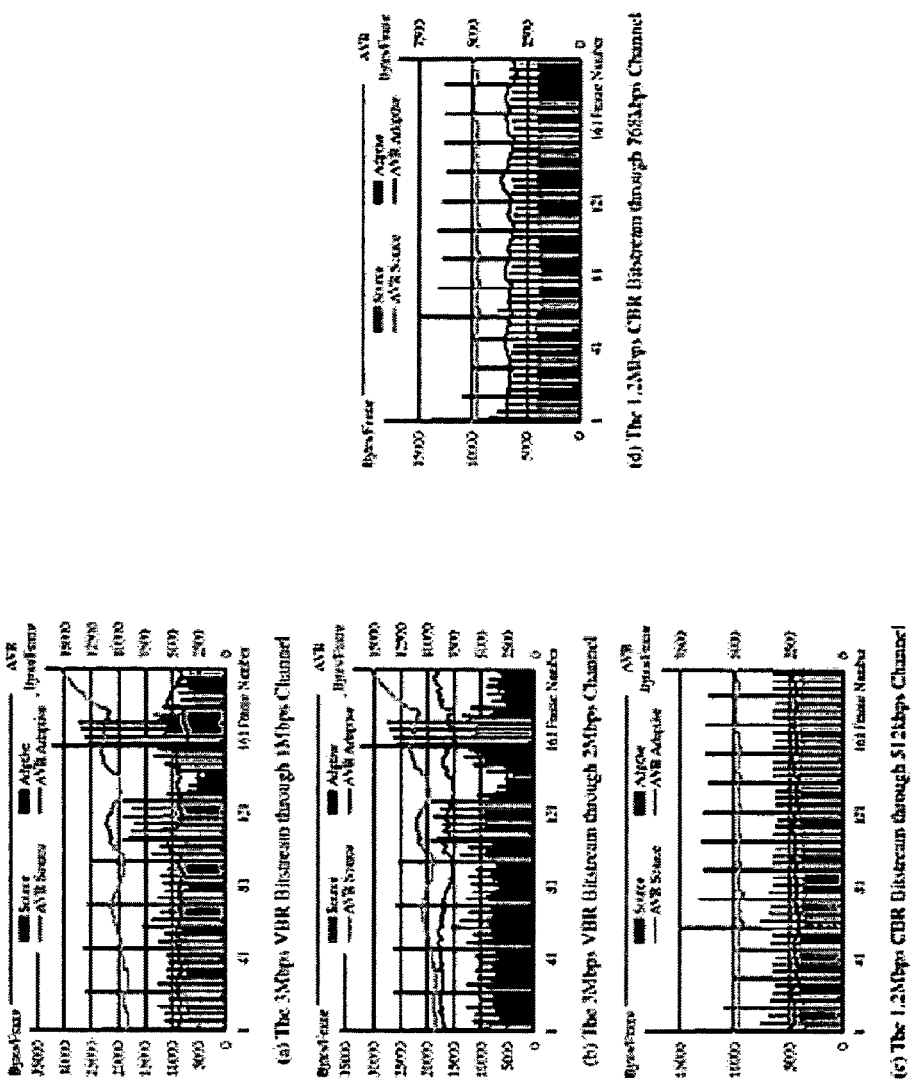
FIG. 8 contains graphs that illustrate aspects of adaptive delivery of VBR/CBR MPEG I bitstreams.
Figure 8A:
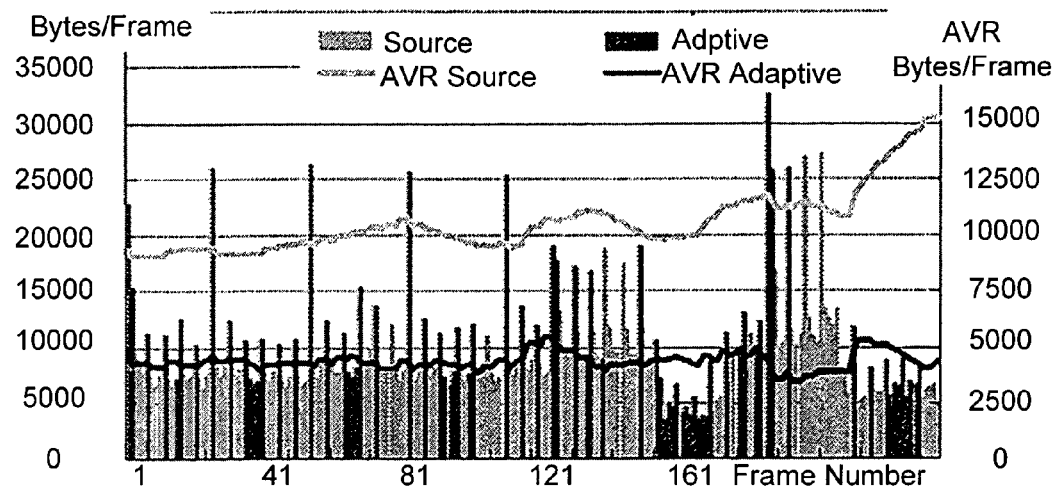
Figure 8B:
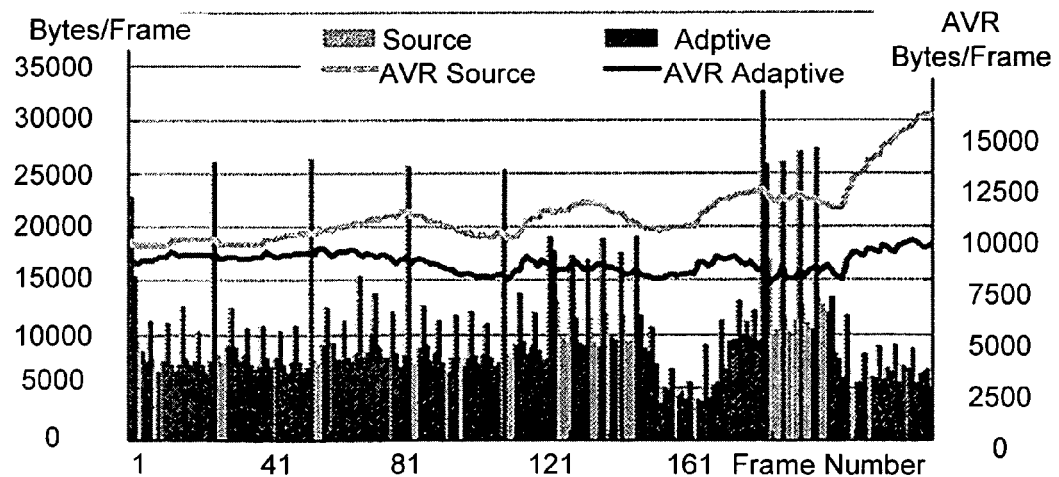
Figure 8C:
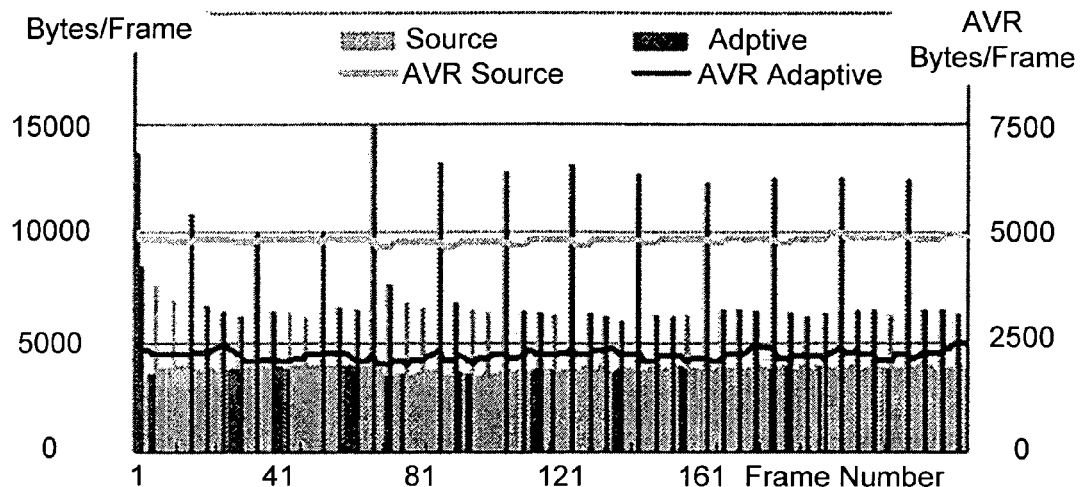
Figure 8D:
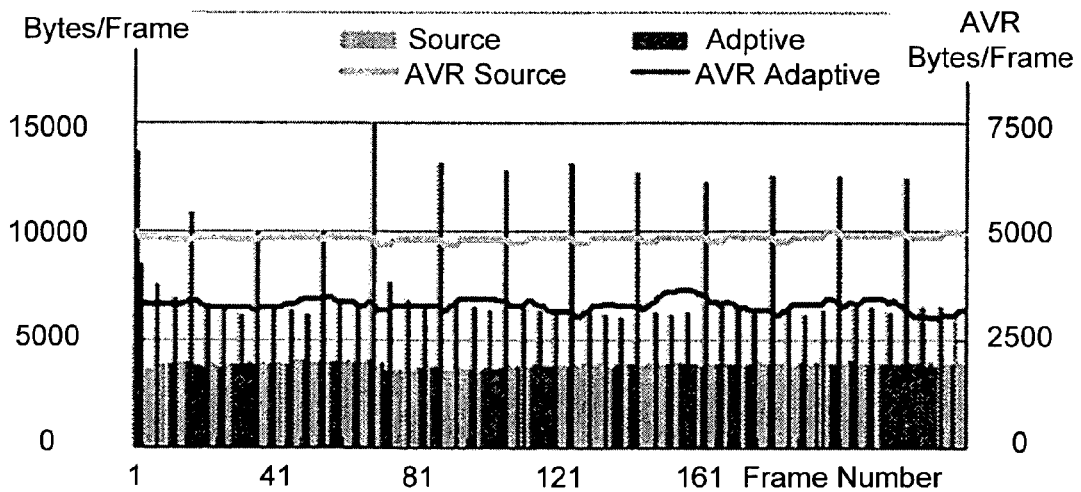
Figure 9:
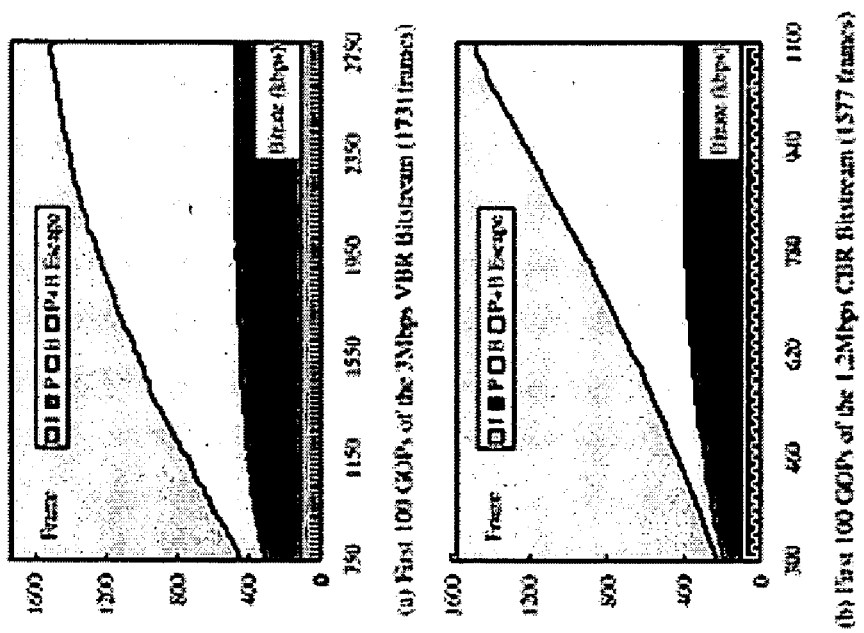
FIG. 9 contains graphs that illustrate aspects of bandwidth versus frame types, in accordance with an example that is given in the text.
Figure 9A:
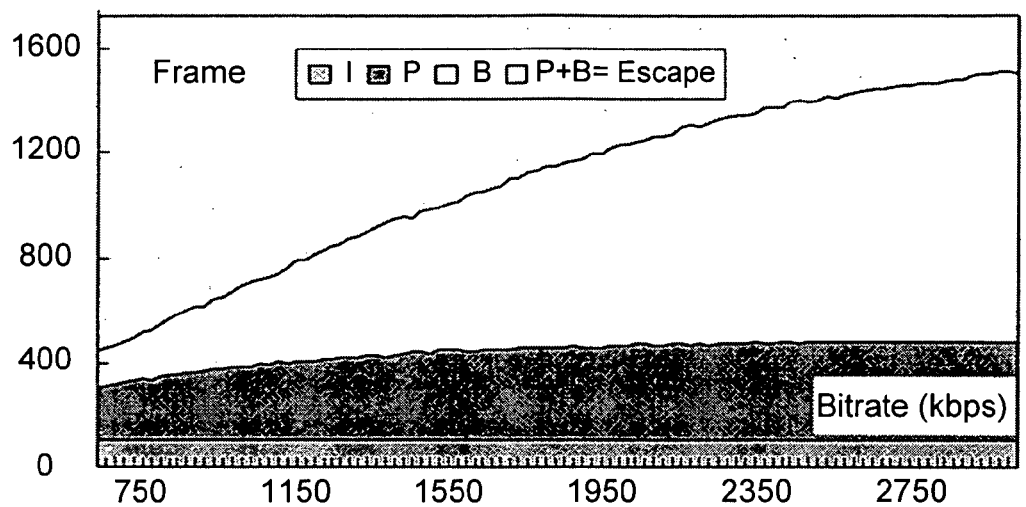
Figure 9B:
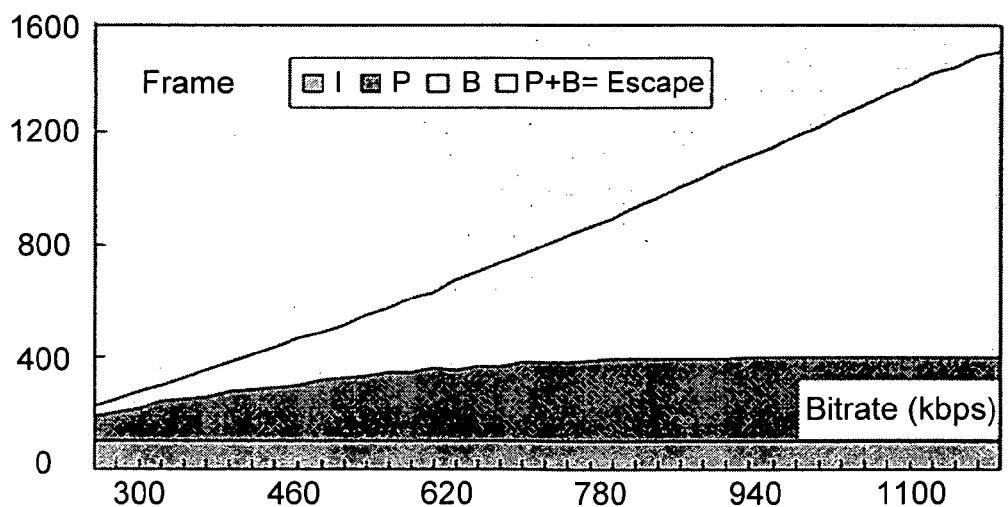

We tested the implementation using both CBR and VBR bitstreams. FIGS. 8 and 9 show some of these results. The 3 Mbps VBR MPEG I bitstream is 320×240×30 fps and is two-pass-coded with minimal bitrate at 1 Mbps and maximal bitrate at 4 Mbps. Its GOP structure is 1I5P3B. The 1.2 Mbps CBR bitstream is 320×240×29.97 fps and is one pass coded. Its GOP structure is 1I3P3B.

FIG. 8 shows delivered frame sizes of the first 200 frames of these two clips at different bandwidths. The curves show the average frames size over a window of 60 frames. One can clearly see which frames are escape-coded during the adaptive delivery process. The delivery bitrate of the 3 Mbps VBR bitstream is also smoothed because we assumed fixed delivery bandwidth. FIG. 9 shows how the statistics of frame types change when the delivery bandwidth changes.

From these results one can see that bandwidths of the delivered streams are successfully reduced and smoothed. Thus, playback of these video bitstreams is possible even when the network bandwidth is far narrower than that the source bitstreams demand and when the client side buffer size is limited. From FIG. 9 one can see that frame data are preserved in the order of importance as preferred. This simple adaptation scheme can have its limitation too. For example, the frame rates of adaptation results are still not ideally adjusted because the structures of the MPEG I video sequence are fixed and the QoS factor definition is not optimal.

Exemplary Application Programming Interfaces

Appearing below are a collection of exemplary application programming interfaces (APIs) that can be utilized to implement embodiments of the system described above.

```
template <class cYourEdge> class TcEdge
{
public:
    TcEdge(int  argnFromNodeID,  int  argnToNodeID):         // The
constructor
        nFromNodeID(argnFromNodeID), nToNodeID(argnToNodeID),
        pNextOutEdge(0), pNextInEdge(0)
    { };
    virtual ~TcEdge( ){ };
    int nFromNodeID;                        // Which node it is from
    int nToNodeID;                          // Which node it goes to
    cYourEdge *pNextOutEdge;                // This is the outgoing edge link list
    cYourEdge *pNextInEdge;                 // This is the incoming edge link list
};
template <class TcEdge> class TcNode
{
public:
    TcNode( );
    virtual ~TcNode( );
    TcEdge *pOutEdge;               // This is the outgoing edge link list
    TcEdge *pInEdge;                // This is the incoming edge link list
};
template <class TcNode, class TcEdge> class TcGraph
{
public:
    TcGraph( );
    virtual ~TcGraph( );
    virtual bool CleanUp( );   // clean up all data in graph
    virtual int AddNode(int nNodeIDPrefered, bool bPreferSmall=true);
    // Add node to graph.   You may specify a preferred nodeID or −1 for
    // automatic assignments. Allocation will from small to larger if
    // bPreferSmall is true
        // return new Node ID on success or the prefered ID if exist, −1
on fail
        virtual int AddNode(TcNode *pNode, int nNodeIDPrefered,
        bool bPreferSmall=true);
        // Add node and assign the node pointer
    // return new Node ID on success or the prefered ID if exist, −1 on fail
        virtual int DeleteNode(int nNodeID);
    // return released Node ID on success, −1 on fail
        virtual unsigned int GetNumNodes( );
        // return the number of nodes on the graph
        virtual TcNode *GetNodePointer(int nNodeID);
        virtual TcNode *SetNodePointer(TcNode *pNode, int nNodeID);
        // Get and Set the node pointer
        virtual TcEdge *AddEdge(int nFromNodeID, int nToNodeID);
        // Add an edge from id1 to id2
    // Return the edge pointer on success or NULL on failure
        virtual int DeleteEdge(int nFromNodeID, int nToNodeID);
        // Delete the edge from ID1 to ID2
        // return the fromid on success and −1 on failure
        virtual TcEdge *GetEdgePointer(int nFromNodeID, int nToNodeID);
        // Get the edge pointer (from , to)
        virtual bool StartNodeEnumeration( );
        // Start enumeration of existing nodes
        // return true if it's ok
        virtual int EnumerateNode( );
        // Get current enumerated node id and advance to next id
        // return current node id on success, return −1 on end of
enumeration
        virtual  unsigned  int  PreRequireNodeBuffer(unsigned  int
requiredsize);
        // Used to pre-allocate node buffer, for better buffer management
only
    private:
        virtual bool AdjustNodeBuffer(int nMaxNodeID);
        // adjust the node pointer buffer to hold new IDs
        // return true if succeeded
        // return false if failed or input parameter is not ok
        // throw cGraphError with fatal errors
        virtual  int      AllocNodeID(int  nPreferedNodeID,  bool
bPreferSmall=true);
        virtual int FreeNodeID(int nNodeID);
        // the following two is used internally for node buffer management
    virtual void MoveMinFreeIDPointer( );
        virtual void MoveMaxFreeIDPointer( );
    };
////////////////////////////////////////////////////////////////
/////
```

```
class cACRESEdge : public TcEdge<cACRESEdge>
{
public:
        cACRESEdge(int argnFromNodeID, int argnToNodeID); // constructor
        virtual ~cACRESEdge( );
        virtual bool UpdateStatus(ACRES_NODE_STATUS statusInNode);
        // update the edge's status, check if it is ignition edge
        // return true if it is.
        // dump my self to a file
        virtual bool WriteFile(FILE *fp);
        // reinit my self from a file
        virtual bool ReadFile(FILE *fp);
        ACRES_EDGEOBJ_TYPES objType;
        // object type, needed by some application to distinguash
// between different classes (RTTI)
        ACRES_EDGE_TYPE eType;
        ACRES_EDGE_STATUS eStatus;         // this is not used for pure route edges
        ACRES_ROUTE_STATUS route;          // this is not used for dependency edges
        int   eCondition;                  // should be const after been created;
};
class cACRESNode : public TcNode<cACRESEdge>
{
public:
        cACRESNode( );
        cACRESNode(int hostID);
        virtual ~cACRESNode( );
        virtual int CheckCondition( );
        // Check if the node can be put into activable one
        // return
        // > 0 active
        // = 0 inactive
        // < 0   permenent inactive    because of cold_forever edge and
condition,
        //           thus should be put into SKIPPED ASAP
        virtual int UpdateOutEdgeStatus(bool includeRoute);
        virtual int ResetOutEdgeStatus(bool includeRoute);
        // return the number of changes made
        // dump my self to a file
        virtual bool WriteFile(FILE *fp);
        // reinit my self from a file
        virtual bool ReadFile(FILE *fp);
        ACRES_NODEOBJ_TYPES objType;
    // node type, needed by some application to distinguash between
        // different classes (RTTI)
        ACRES_NODE_STATUS nStatus;
        ACRES_NODE_CONDITION nCondition;
        ACRES_NODE_BEHAVIOR behavior;
        int nLayer;                        // required by ACRES validator
        int nHostID;                       // which host object is responsible to this
one
};
        class cACRES : public TcGraph<cACRESNode, cACRESEdge>
        {
        public:
        cACRES( );
        virtual ~cACRES( );
        virtual int AddNode(int nNodeIDPrefered, bool bPreferSmall=true)
{return −1;}
// because host ID is always required, this one is not valid for me,
// so overload by return null
        virtual int AddNode(int nNodeIDPrefered, int hostID, bool
    bPreferSmall=true);
        virtual int AddNode(cACRESNode *pNode, int nNodeIDPrefered,
        bool bPreferSmall=true);
        virtual int Validate(bool reset_status, bool clean_nodes);
// Check if the current ACRES data structure is valid.
// This routine will check for the hierarchies and update all node
// layer info
        virtual int Reset(int nIDfrom);
// reset all node and edge status that are affected by status of nIDfrom
        // if nIDfrom = −1, then reset all
        virtual int AddHost(cACRESHost * pHost, int nPreferedHostID,
        bool bPreferSmall=true);
// Add a content host and allocate HostID for it.
        virtual int RemoveHost(int hostID);
        // Remove a content host
        virtual cACRESHost * GetHost(int hostID);
        // Gt the pointer to the host from its ID
        virtual cACRESHost * SetHost(cACRESHost *pHost, int hostID);
```

```
        // Set the host pointer
        // Enumerate the content host table
        virtual bool StartHostEnumeration( );
        virtual int EnumerateHost( );
        // dump my self to a file
        virtual bool WriteFile(FILE *fp);
        // reinit my self from a file
        virtual bool ReadFile(FILE *fp);
        ACRES_OBJ_TYPES objType; // my RTTI
    protected:
        virtual bool AdjustHostBuffer(int nMaxNodeID);
        // adjust the node pointer buffer to hold new IDs
        // return true if succeeded
        // return false if failed or input parameter is not ok
        // throw cGraphError with fatal errors
        virtual    int    AllocHostID(int    nPreferedNodeID,    bool
bPreferSmall=true);
        virtual int FreeHostID(int nNodeID);
        virtual void MoveMinFreeHostIDPointer( );
        virtual void MoveMaxFreeHostIDPointer( );
    };
    class cACRESHost
    {
    friend cACRESHost * cACRES::SetHost(cACRESHost *pHost, int hostID);
    // this function will assign the pACRES and nHostID for this host object
    public:
        cACRESHost( )    :    pACRES(NULL),    nHostID(-1),
ObjType(_ACRES_HOSTOBJ_BASIC)
        { };
        ~cACRESHost( ){ };
        virtual bool Reset(void) {return false;};
        virtual cACRESNode * CreateNode( )=0;
        // The user application call this to create the content node
        virtual bool GetNodeContent(int nNodeID, ACRESContent *pCont)
    {return false;};
        // Get the content represented by the Node
        virtual   bool   NotifyDeliveredNodeContent(int   nNodeID)   {return
false;};
        // The Decision engine call this if the node is delivered.
        virtual double GetNodeValue(int nNodeID, double nTime) {return 0;}
        virtual    double    GetNodeCost(int    nNodeID,    ACRES_NODE_STATUS
tostatus,
        double nTime) {return 0;}
        virtual double GetNodeResource(int nNodeID, ACRES_RESOURCE_TYPE
nResource)
        {return 0;}
        virtual double CheckPreferece(int nNodeID, void *pPref) {return
0;}
        // check compatibility, preference, profile, ...
        virtual bool GetTimePreference(int nNodeID, double *pTimePref)
    {return false;}
        // time base of hosted contents, may only be useful for dynamic
contents
    virtual double SetTimeBase(double timebase){return 0;};
        virtual double GetTimeBase( ) {return 0;};
        // dump my self to a file
        virtual bool WriteFile(FILE *fp)                {return true;};
        // reinit my self from a file
        virtual bool ReadFile(FILE *fp)                 {return true;};
        // Add more common Host API here
        /////////// OBJ TYPE //////////////
        ACRES_HOSTOBJ_TYPES objType;   // my RTTI
protected:
        cACRES *pACRES;         // On which ACRES I am
        int nHostID;            // My ID
    };
/////////////////////////////////////////////////////////
//////
    class cDecision
    {
    public:
        cDecision(cTimeTicker *pTicker);
        // the decision engine gets it's system clocks
        ~cDecision( );
        virtual bool AssignContent(cACRES *pACRES);
    // Give it our content
        virtual bool AssignOutput(cOUTPUT *pOUT);
        // Setup the output API
        virtual bool setResource(ACRES_RESOURCE_TYPE restype,
```

```
            cResourceModel *pRes);
            // Setup the resource model
            virtual bool SetLookForward(unsigned int nlookres,
            unsigned int nlookdecision);
            // Set the search parameter
            virtual  unsigned  int  GetSystemClock( )  {return  sysclock-
>GetTick( );};
            virtual bool Startup( );
            virtual int RunEngine(int *delivered);
            // call it every clock tick
            // return the number of delivered nodes in int *delivered
            // and the number of status changes during the run
            virtual bool ContentPending( );
            // check if there are still deliverable contents left
        protected:
            virtual bool Cleanup(bool all);
            virtual int Qualificator( );
            // Update node statuses and prepare the candidate set
            virtual int Planner( );
            // Run the decision procedure
            virtual int Deliverer( );
            // Call the output API
            virtual double CostEffective(double value, double cost,
            double timenow, double timepref);
            // calculating the value of content
            // Implementation of optimized searching algorithm
            //
            virtual bool InitFuturePlanner(unsigned int maxPredicts);
            virtual double FuturePlannerCheckDelay(double res);
            virtual   bool   FuturePlannerAllocateResource(int   nID,   cACRESHost
*pHost,
            double &delay);
            virtual bool FuturePlannerFreeResource(int nID, cACRESHost *pHost,
            double &delay);
            virtual int   FuturePlannerExpand(int level, int maxlevel,
                int nTryNodeID, cACRESNode *pTryNode,
                cDENodeList *pFire, cACRESEdge *pEdge,
                double  &totalbenifit,  double  &totalvalue,  double
&totalcost);
            virtual int   FuturePlanner(int level, int maxlevel,
            double &totalbenifit, double &totalvalue, double &totalcost,
            int &idFrom);
            virtual bool DeInitFuturePlanner( );
            // used for resource management during the decision process
            virtual double ResourceManager(bool init);
            virtual double CheckResource(ACRES_RESOURCE_TYPE restype);
            virtual double LookForwardResource(ACRES_RESOURCE_TYPE restype,
            unsigned int systick);
            virtual bool ReserveResource(int nID, cACRESNode *pNode, double
*delay);
            // These two routines are used to maintain the candidate sets
which
            // are implemented as link lists
            virtual cDENodeList* AddTo(cDENodeList* &rpList, int nid,
                cACRESNode *pNode, int fromid);
            virtual cDENodeList* DeleteFrom(cDENodeList* &rpList,
                    cDENodeList *pElem, bool drop=true);
            virtual int UpdateRelatedNodeStatus(int nid, cACRESNode *pNode,
            bool updateEdge, int fromid);
            // update the status of related nodes if my status is changed
            virtual int UpdateRouteToWarmLine(int nid, cACRESNode *pNode);
            // Update WarmLine nodes from a FireLine Node
            // return the possible usable routes of the FireLineNode;
            // return −1 for errors
            virtual int CheckRouteToWarmLine(int nid, cACRESNode *pNode);
            // check if this node can goto warmline or potentially goto
warmline
            // return −1 for errors
            // return 0 for not be able to reach any inactive or activable
nodes
            // return 1 for yes
            virtual cDENodeList * FindInList (int nid, cDENodeList *pList);
            // find the node in a list sorted increasely by Layer and NodeID
            int   SkipValuelessRouteNodes (int   nid,   cACRESNode   *pNode,   int
&numskip);
            // return the number of valuable/branchable route nodes
        };
```

Conclusion

Methods and systems that provide a framework for generic adaptive multimedia content delivery have been described. The framework features an abstract content model and an abstract adaptation decision engine that can make adaptive delivery plans without knowing much of the physical details of actual content. The capabilities of the framework have been demonstrated with an application of adaptive video streaming. Experimental results further show that the proposed framework is effective and efficient in adaptive delivery of contents under variable network conditions. The described architecture can be easily extended to have much stronger capabilities.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A data structure embodied on one or more computer-storage media, the data structure comprising:
    an abstract content model that represents content that can be requested by a content requester, the abstract model comprising a directional graph that features a top-down hierarchical structure having nodes that represent components of the content and edges that represent relationships between the nodes, the nodes being configured to have a node status that defines dynamic statuses of the nodes during content delivery, wherein the node status comprises one or more of the following:
        an activable status wherein an active condition of the node is satisfied but the node is not yet included in a delivery plan, the active condition is satisfied when an automatically activable condition is present, an OR condition such that an input edge of the node is an ignition edge is present, or an AND condition such that all input edges of the node are ignition edges is present; or
        an activated status wherein the node is included in the delivery plan;
    the abstract content model being configured for processing so that the delivery plan for delivering the content corresponding to the nodes having an activated status can be selected.

2. The data structure of claim 1, wherein the node status further comprises an inactive status where the node is not yet a deliverable object.

3. The data structure of claim 1, wherein the node status further comprises a delivered status wherein the node has been delivered successfully to a content receiver.

4. The data structure of claim 1, wherein the node status further comprises a skipped status wherein the node is not delivered and will not be included in the delivery plan.

5. The data structure of claim 1, wherein there are multiple different types of edges.

6. The data structure of claim 5, wherein the multiple different types of edges comprise a dependency edge type that defines a logical dependency between nodes.

7. The data structure of claim 5, wherein the multiple different types of edges comprise a route edge type that defines an ordered or hierarchical dependency between nodes.

8. The data structure of claim 5, wherein the multiple different types of edges comprise a mixed edge type that defines a logical dependency between nodes and an ordered or hierarchical dependency between nodes.

9. The data structure of claim 5, wherein the multiple different types of edges comprise one or more of the following:
    a dependency edge type that defines a logical dependency between nodes,
    a route edge type that defines an ordered or hierarchical dependency between nodes, or
    a mixed edge type that defines a logical dependency between nodes and an ordered or hierarchical dependency between nodes.

10. A system comprising:
    a computing device having a memory, the memory storing a data structure comprising:
        an abstract content model that represents content that can be requested by a content requester, the abstract model comprising a directional graph that features a top-down hierarchical structure having nodes that represent components of the content and multiple different types of edges that represent relationships between the nodes, the nodes being configured to have a node status that defines dynamic statuses of the nodes during content delivery, wherein the node status comprises at least one of:
            an inactive status where the node is not yet a deliverable object;
            an activable status wherein an active condition of the node is satisfied but the node is not yet included in a delivery plan, the active condition is satisfied when an automatically activable condition is present, an OR condition such that an input edge of the node is an ignition edge is present, or an AND condition such that all input edges of the node are ignition edges is present;
            an activated status wherein the node is included in the delivery plan;
            a delivered status wherein the node has been delivered successfully to a content receiver; or
            a skipped status wherein the node is not delivered and will not be included in the delivery plan; and
        the multiple different types of edges comprise one or more of the following:
            a dependency edge type that defines a logical dependency between nodes;
            a route edge type that defines an ordered or hierarchical dependency between nodes; and
            a mixed edge type that defines a logical dependency between nodes and an ordered or hierarchical dependency between nodes; and
        the abstract content model being configured for processing so that the delivery plan for delivering content corresponding to the nodes having an activated status can be selected.

11. The system claim 10 wherein the active condition defines how a one of the nodes is designated as having the activable status.

12. The system claim 11 wherein nodes that are automatically activable have the activable status.

13. The system of claim 10 wherein the multiple different types of edges further comprise ignition edges defined as a dependency edge from a node that has the activated status, delivered status, or the skipped status.

14. The system of claim 13 wherein nodes that satisfy an OR condition have the activable status, the OR condition comprising nodes wherein at least one input edge is the ignition edge.

15. The system claim 13 wherein nodes that satisfy an AND condition have the activable status, the AND condition comprising nodes wherein all input edges are ignition edges.

16. A method implemented on a computing device by a processor configured to execute instructions that, when executed by the processor, direct the computing device to perform acts comprising:

receiving multimedia contents;

processing, by the processor, the multimedia contents to build an abstract content model that represents multimedia content that can be requested by a content requester, wherein the abstract content model is represented by a data structure comprising:

a directional graph that features a top-down hierarchical structure having nodes that represent components of the multimedia contents and multiple different types of edges that represent relationships between the nodes;

wherein the nodes have a node status that defines dynamic statuses of the nodes during content delivery, the node status comprising at least one of:

an inactive status where the node is not yet a deliverable object;

an activable status wherein an active condition of the node is satisfied but the node is not yet included in a delivery plan, the active condition is satisfied when an automatically activable condition is present, an OR condition such that an input edge of the node is an ignition edge is present, or an AND condition such that all input edges of the node are ignition edges is present;

an activated status wherein the node is included in the delivery plan;

a delivered status wherein the node has been delivered successfully to a content receiver; or a skipped status wherein the node is not delivered and will not be included in the delivery plan;

wherein the edges have an edge type comprising at least one of:

a dependency edge type that defines a logical dependency between nodes;

a route edge type that defines an ordered or hierarchical dependency between nodes;

a mixed edge type that defines a logical dependency between nodes and an ordered or hierarchical dependency between nodes; and an ignition edge type defined as a dependency edge from a node that has the activated status, delivered status, or the skipped status; and processing, by the processor, the abstract content model to select the delivery plan for delivering the multimedia contents.

17. The method of claim 16 wherein the active condition of the node is satisfied when:

the node is automatically activable;

at least one input edge of the node is an ignition edge; or all the input edges of the node are ignition edges.

18. The method of claim 17 wherein a top most node is automatically activable.

19. The method of claim 16 wherein the node status changes from the activable status to the active status when an input condition is satisfied.

20. The method of claim 19 wherein the input condition is satisfied when the node has an incoming a route edge from another node having the activated status, the delivered status, or the skipped status.

* * * * *